(12) United States Patent
Masuda

(10) Patent No.: US 6,179,106 B1
(45) Date of Patent: Jan. 30, 2001

(54) DAMPER DEVICE IN LOCK-UP CLUTCH FOR TORQUE CONVERTER

(75) Inventor: Yuzo Masuda, Kariya (JP)

(73) Assignee: Aisin Seiki Kabushiki Kaisha, Kariya (JP)

( * ) Notice: Under 35 U.S.C. 154(b), the term of this patent shall be extended for 0 days.

(21) Appl. No.: 09/383,376

(22) Filed: Aug. 26, 1999

(30) Foreign Application Priority Data

Aug. 26, 1998 (JP) .................................................. 10-240748

(51) Int. Cl.[7] ............................. F16D 33/00; F16D 35/00; F16D 37/00
(52) U.S. Cl. ....................... 192/3.29; 192/3.28; 192/212; 464/64; 464/68
(58) Field of Search ..................................... 192/3.28, 5.5, 192/61, 212, 213, 3.29; 464/64, 68

(56) References Cited

U.S. PATENT DOCUMENTS 5,595,539 * 1/1997 Yamamoto .............................. 464/24
5,935,008 * 8/1999 Mizukami .............................. 464/68

FOREIGN PATENT DOCUMENTS

| 60-175865 | 9/1985 | (JP) . |
| 61-252962 | 11/1986 | (JP) . |
| 62-56623 | 3/1987 | (JP) . |
| 3-194247 | 8/1991 | (JP) . |
| 10082450 * | 3/1998 | (JP) ..................................... 192/3.28 |

* cited by examiner

Primary Examiner—Charles A Marmor
Assistant Examiner—Tisha D. Waddell
(74) Attorney, Agent, or Firm—Burns, Doane, Swecker & Mathis, LLP

(57) ABSTRACT

In a damper device in a lock-up clutch for a torque converter device, a projection is integrally formed at either the driving or driven plates and an arc-shaped expanded part is integrally formed at the other of the driving and driven plates. The arc-shaped expanded part is provided with a concave portion which has a circumferential end. The integral projection is fitted in the concave portion in such a manner that the maximum relative rotation between the driving and driven plates is attained when the integral projection is engaged with the circumferential end of the concave portion.

12 Claims, 5 Drawing Sheets

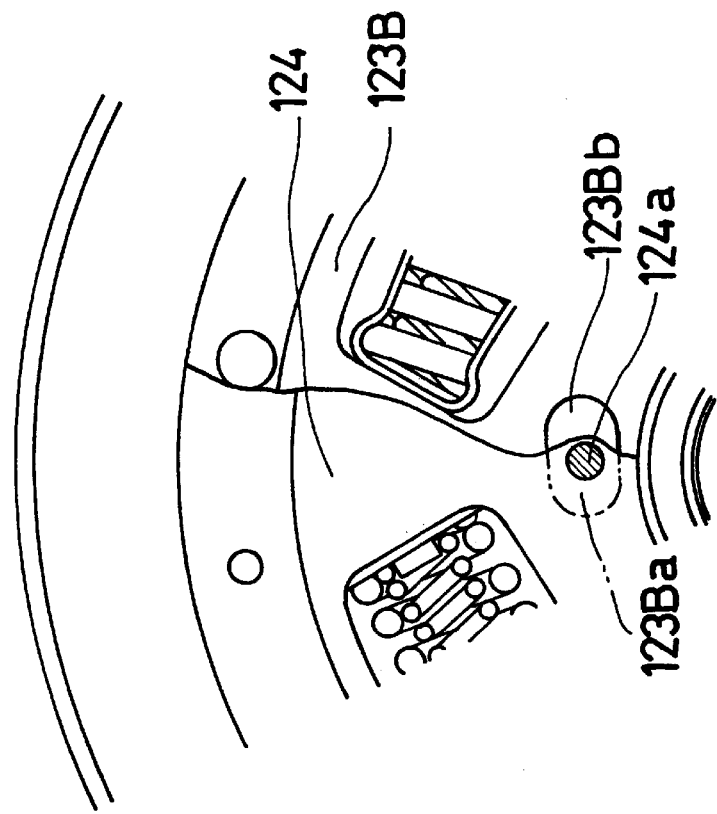
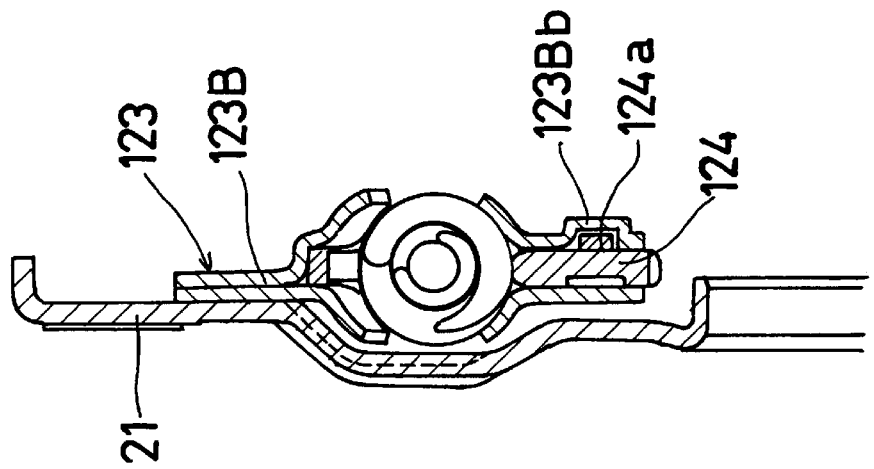

DAMPER DEVICE IN LOCK-UP CLUTCH FOR TORQUE CONVERTER

This application is based on and claims priority under 35 U.S.C. § 119 with respect to Japanese Application No. 10(1998)-24078 filed on Aug. 26, 1998, the entire content of which is incorporated herein by reference.

FIELD OF THE INVENTION

The present invention generally relates to a torque converter. More particularly, the present invention pertains to a stopper structure forming a part of the damper device used in the lock-up clutch for a torque converter to restrict relative rotation between the driving and driven plates within a set angle.

BACKGROUND OF THE INVENTION

Known stopper structures of a damper device used in a lock-up clutch for a torque converter are disclosed in, for example, Japanese Patent Laid-Open Publication No. Sho. 60-175865, Japanese Patent Laid-Open Publication No. Sho.61-252962, Japanese Patent Laid-Open Publication No. Sho. 62-56623 and Japanese Patent Laid-Open Publication No. Hei.3-194247.

With such known damper devices, it has been found that some stopper structures must be mechanically strengthened or reinforced by heat treatment due to the fact that the pressure-receiving area is narrow, and the remaining stopper structures are rather complex in construction. Thus, with the stopper structures used in these known damper devices, additional production steps are necessary when the damper device is manufactured.

Thus the aforementioned damper devices are not well suited to being manufactured in a way that allows the production costs of the damper device to be reduced.

A need thus exists for a damper device which can be produced at a lower cost, yet which is identical or superior to the known damper devices in construction and operational characteristics.

SUMMARY OF THE INVENTION

In light of the foregoing, the present invention provides a damper device in a lock-up clutch for a torque converter device in which a driving plate is connected to a friction plate which is engaged with or disengaged from an input member of the torque converter, a driven plate rotates relative to the driving plate and is connected to an output member of the torque converter, and a spring device is interposed between the driving plate and the driven plate to establish torque transmission and torque absorption. The damper device includes a projection integrally formed on one of the driving plate and the driven plate, and an arc-shaped expanded part integrally formed at the other of the driving plate and the driven plate. The arc-shaped expanded part is provided with a concave portion having a circumferential end, and the projection is fitted in the concave portion so that the maximum relative rotation between the driving plate and the driven plates is attained when the projection engages the circumferential end of the concave portion.

According to another aspect of the invention, a torque converter device includes an input member, an output member, and a damper device. The damper device includes a driving plate connected to a friction plate which is engageable with and disengageable from the input member, a driven plate rotatable relative to the driving plate and connected to the output member, and an elastic device interposed between the driving plate and the driven plate to establish torque transmission and torque absorption. The damper device further includes a projection integrally formed in one piece with one of the driving plate and the driven plate, and an arc-shaped expanded part integrally formed in one piece with the other of the driving plate and the driven plate. The arc-shaped expanded part possesses a recessed portion in which is positioned the projection so that the maximum relative rotation between the driving plate and the driven plates is attained when the projection engages the circumferential end of the recessed portion.

Another aspect of the invention involves a damper device in a lock-up clutch of a torque converter device in which a driving plate is connected to a friction plate which is engaged with or disengaged from an input member of the torque converter and a driven plate rotates relative to the driving plate and is connected to an output member of the torque converter. The damper device includes at least one opening formed in the driven plate, at least one opening formed in the drive plate, and an elastic device positioned in the opening in the driven plate and the opening in the drive plate to establish torque transmission between the driven plate and the drive plate and to absorb torque variation between the drive plate and the driven plate. The damper device also includes a mechanism formed integrally and in one piece as a unitary structure with both the driven plate and the drive plate to prevent relative rotational movement between the driven plate and the drive plate after the driven plate and the drive plate have rotated a predetermined amount relative to one another.

BRIEF DESCRIPTION OF THE DRAWING FIGURES

The above and other features and characteristics of the present invention will become more apparent from the following detailed description considered with reference to the accompanying drawing figures in which like elements are designated by like reference numerals and wherein:

FIG. 6 is a cross-sectional view of a portion of the damper device according to another embodiment of the present invention; and FIG. 7 is a plan view of a portion of the damper device show in FIG. 7.

DETAILED DESCRIPTION OF THE PRESENT INVENTION

Figure 1:
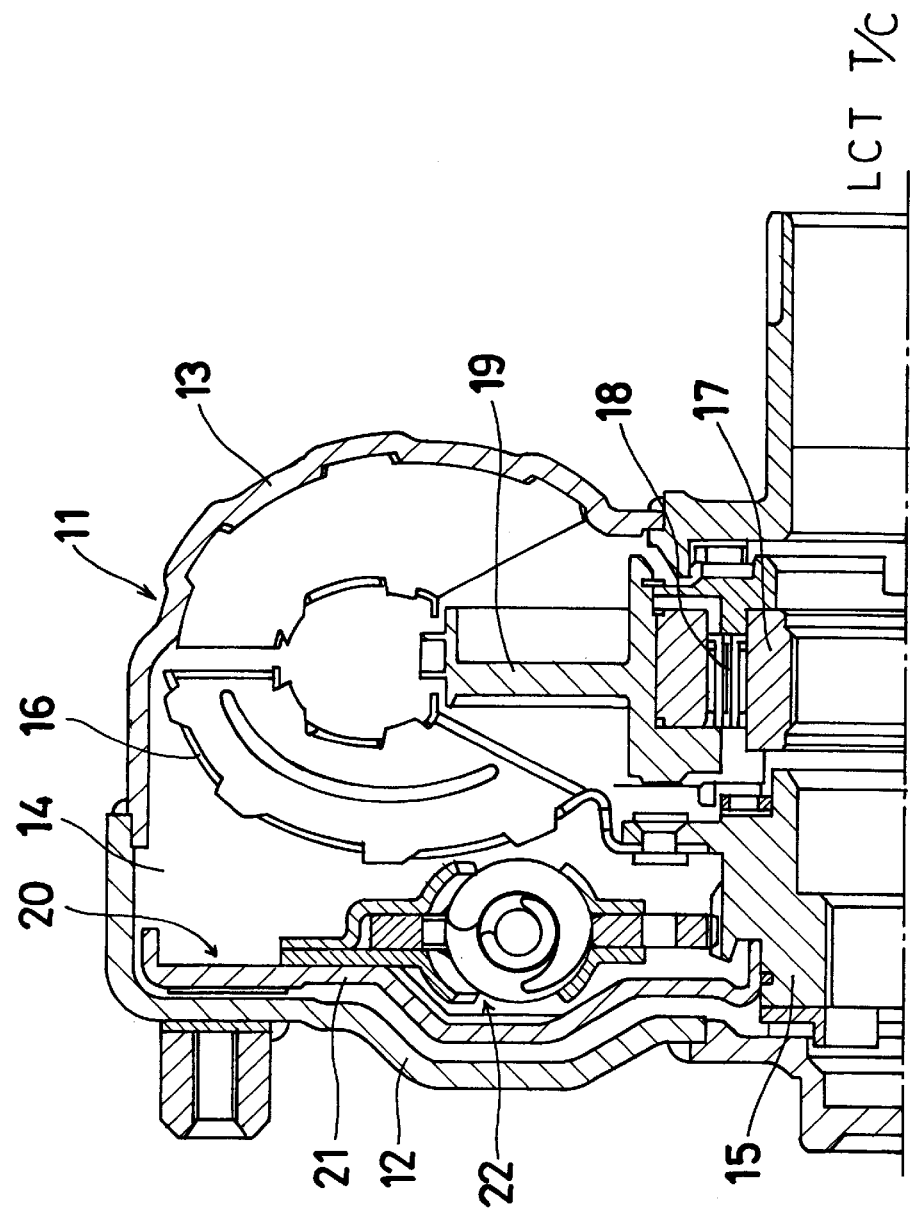
FIG. 1 is a cross-sectional view of a lock-up clutch for a torque converter in which the damper device is included.

Referring initially to FIG. 1, a torque converter 11 includes a front cover 12 serving as an input member, a pump impeller 13 coupled to the front cover 12 so as to be rotated together with the front cover 12, a fluid chamber 14 defined between the pump impeller 13 and the front cover 12, a turbine impeller 16 accommodated in the fluid chamber 14 and coupled to a turbine hub 15 serving as an output member so as to be rotated together with the turbine hub 15, and a stator 19 supported via a one-way clutch 18 on a stationary inner race 17.

A lock-up clutch 20 is installed in the fluid chamber 14. This lock-up clutch 20 includes a clutch piston 21 with a friction material formed as a friction plate and a damper device 22. The clutch piston 21 is mounted on the turbine hub 15 to be movable in the axial direction of the hub 15. This movement of the clutch piston 21 causes engagement and disengagement of the clutch piston 21 with the front cover 12. The damper device 22 transmits rotational torque to the turbine hub 15 which is transmitted to the clutch piston 21 from the front cover 12.

Figure 2:
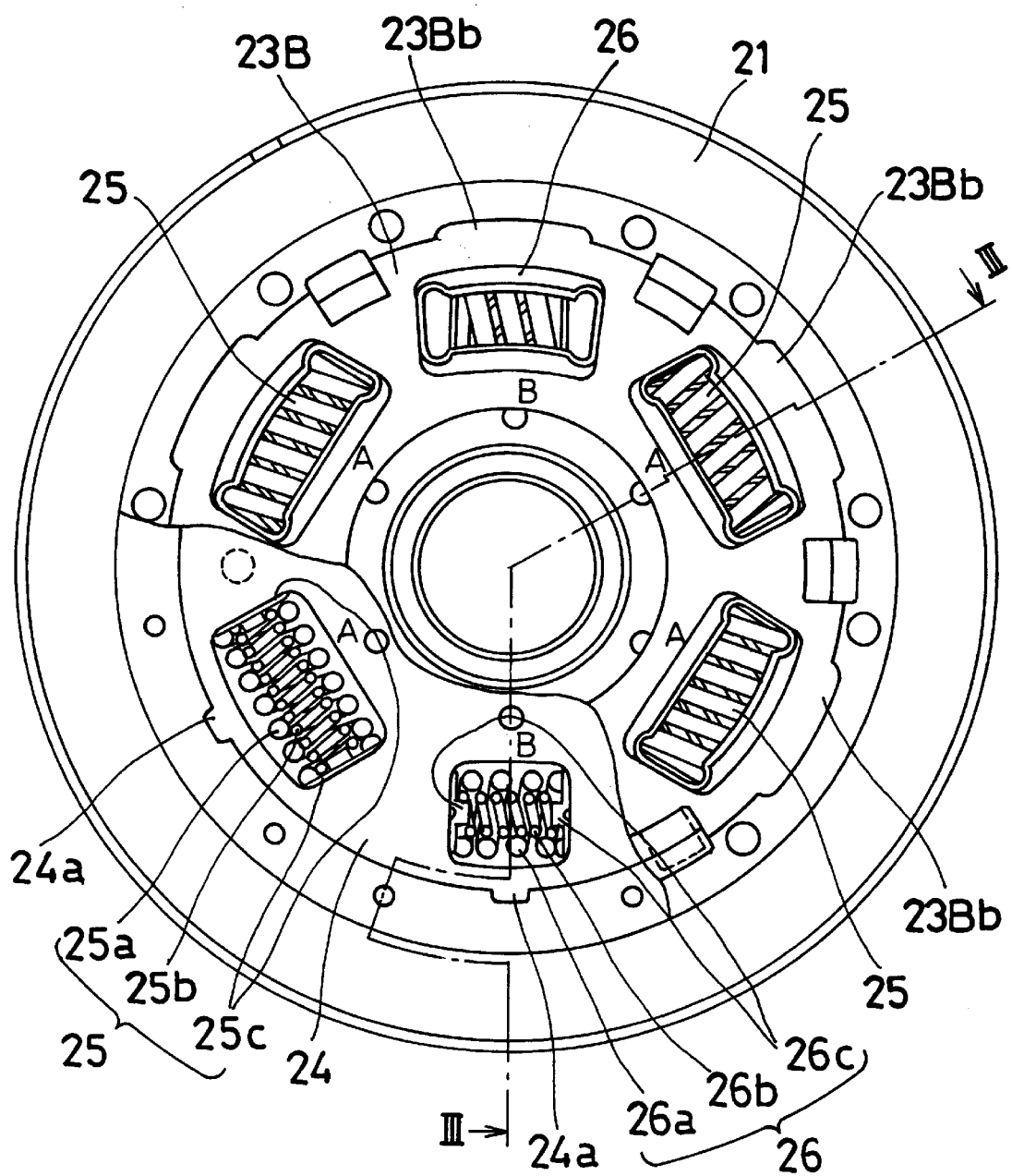
FIG. 2 is a plan view of the damper device.
Figure 3:
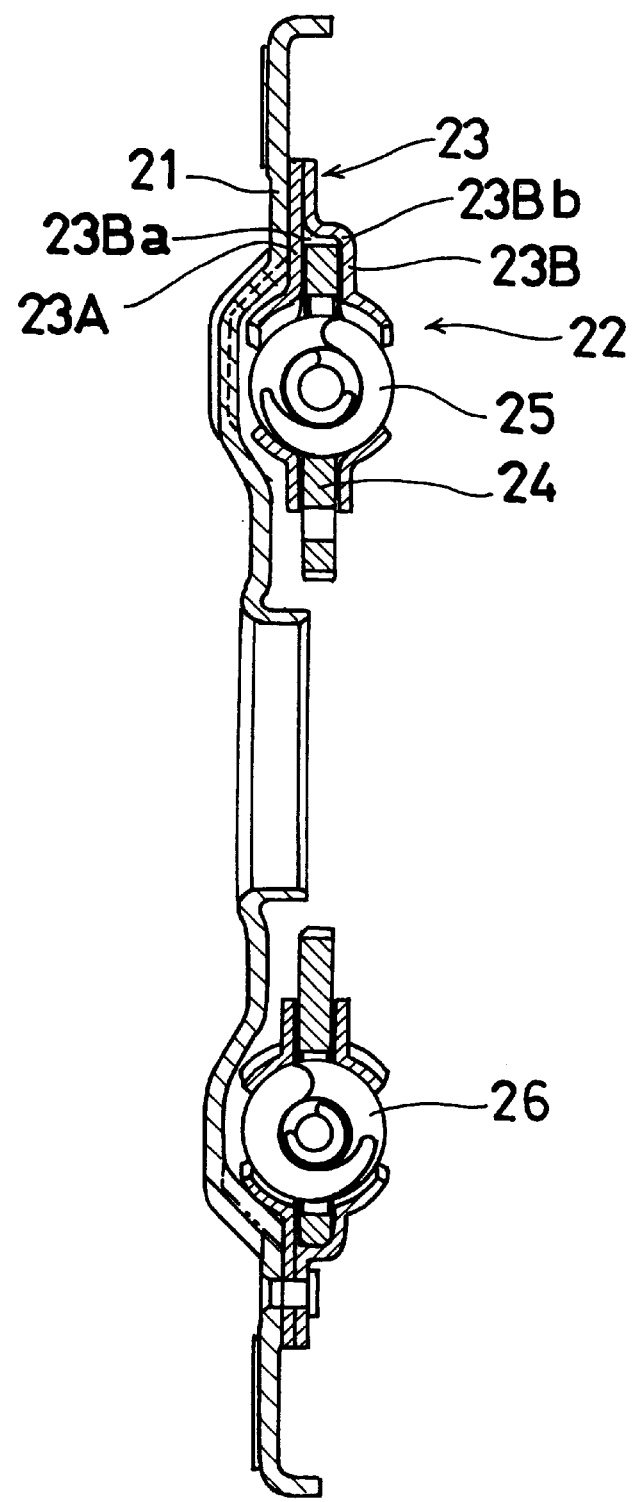
FIG. 3 is cross-sectional view of the damper device taken along the section line III—III in FIG. 2.
Figure 4:
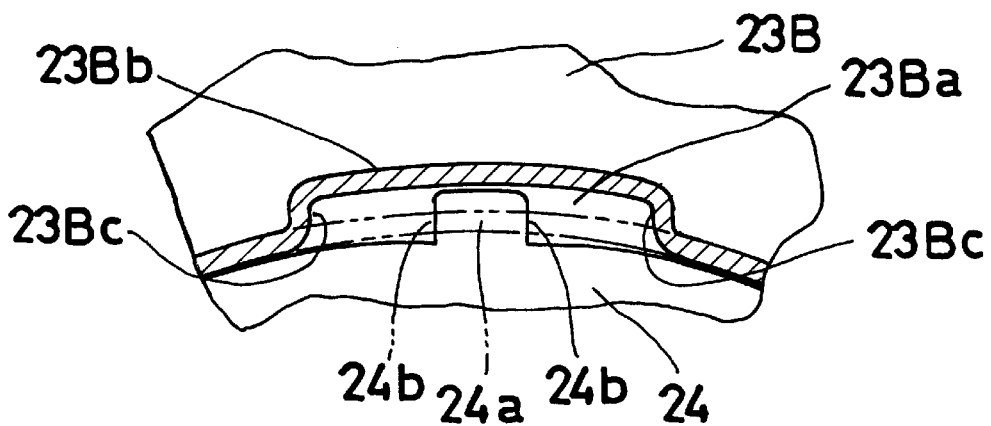
FIG. 4 is an enlarged plan view, partially in cross-section, of a portion of the damper device illustrated in FIG. 2 and showing the stopper structure.

As best shown in FIGS. 2–4, the damper device 22 includes a side plate 23 forming a driving plate which is coupled at its outer periphery to the clutch piston 21 by, for example, rivets. The damper device 22 also includes a disc 24 forming a driven plate 24 which is coupled at its inner periphery to the turbine hub 15 in, for example, a spline manner. To establish torque transmission between the side plate 23 and the disc 24 and an absorption of torque variation, elastic devices in the form of, for example, a first set of plural spring devices 25 (first spring devices) and a second set of plural spring devices 26 (second spring devices) are provided between the side plate 23 and the disc 24. The first and second sets of spring devices 25, 26 are provided in such a manner that each of the spring devices 25 and each of the spring devices 26 are small and large, respectively, in spring constant.

The side plate 23 includes one plate member 23A located in opposition to one side of the disc 24 and another plate member 23B located in opposition to the outer periphery and the other side of the disc 24. The disc 24 has a thickness which is preferably greater than that of each of the plate members 23A, 23B.

The first spring devices 25 include an outer spring 25a, an inner spring 25b accommodated within the outer spring 25a, and a pair of spring seats 25c between which both of the springs 25a, 25b are interposed. The spring devices 25 having this construction are fitted in elongated windows formed in both the disc 24 and the side plate 23 (i.e., the plate members 23A, 23B).

The second spring devices 26 include an outer spring 26a, an inner spring 26b accommodated within the outer spring 26a, and a pair of spring seats 26c between which both of the springs 26a, 26b are interposed. The spring devices 26 having this construction are fitted in a relatively long window formed in the disc 24 and a relatively short window formed in the side plate 23.

Figure 5:
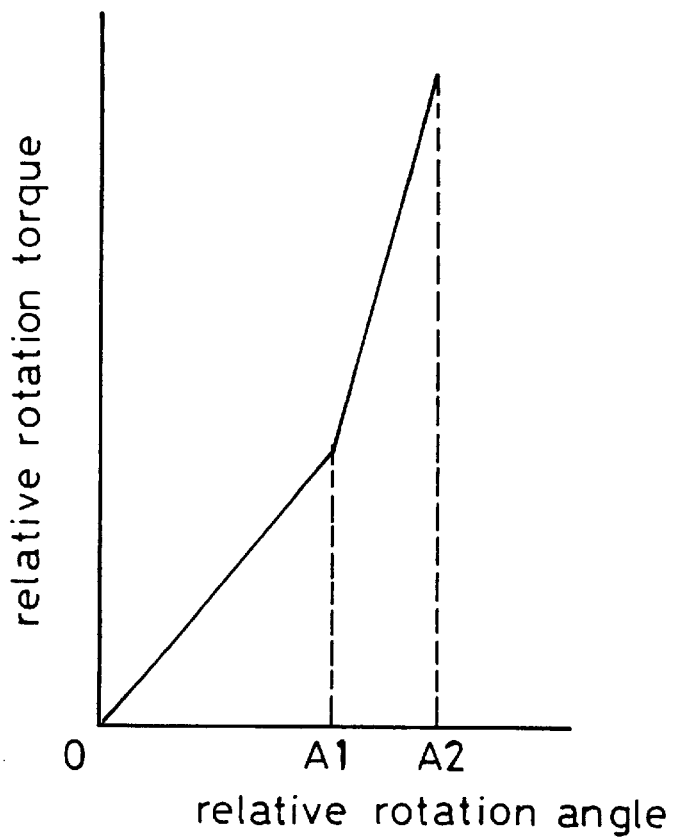
FIG. 5 is a graph showing the relationship between relative torque and relative rotation angle.

Each first spring device 25 always establishes torque transmission between the side plate 23 and the disc 24, while the spring devices 26 establish torque transmission between the side plate 23 and the disc 24a only when a relative angular displacement between the side plate 23 and the disc 24a is not less than a set angle A1 as shown in FIG. 5.

To increase the relative angular displacement between the side plate 23 and the disc 24 from the set value A1 to another value A2 shown in FIG. 5, the disc 24 is provided at its periphery with a plurality of equally spaced or six angularly equally-pitched integral projections 24a. These projections 24a extend in the radial direction.

Integrally formed at the portion of the plate member 23A of the side plate 23 which is in opposition to the outer periphery of the disc 24 are six equally spaced arc-shaped expanded parts 23Bb, each of which has a concave or recessed portion 23Ba. Each recessed portion 23Ba forms a radially outwardly extending blind recessed portion. One of the projections 24a of the disc 24 is fitted in each of the concave portions 23Ba. If the relative rotation angle between the side plate 23 and the disc 24 is increased to the value A2 shown in FIG. 5, a circumferential wall 23Bc of the part 23Bb is brought into engagement with a side 24b of the projection 24a which is oriented circumferentially. This thus prevents further increase in the relative rotation angle between the side plate 23 and the disc 24.

The disc 24 is produced through a process that involves stamping out a raw material plate, with the projections 24a being concurrently obtained or produced during such stamping out process. Thus, the projections 24a are formed integrally, in one piece and as a unitary structure with the disc 24. In addition, the expanded parts 23Bb of the plate member 23B can be obtained or formed at the same time when the plate member 23B is formed through a press formation. Thus, in comparison with other known damper devices that do not possess projections and expanded parts similar to the projections 24a and expanded parts 23Bb of the present invention, no additional processing steps are required to produce the damper device of the present invention.

In addition, the engagement between the circumferential wall 23Bc of the part 23Bb and the side of the projection 24 helps ensure a sufficient pressure-receiving area. Due to the fact that the circumferential flexural strength of the wall 23Bc of the parts 23Bb is relatively high, the mechanical strength of the plate member 23B is not reduced, thereby making heat treatment of the projections 24a and the parts 23Bb unnecessary. Thus, the side plate 23 and the disc 24 can be manufactured at lower costs.

It is also to be noted that, as can be seen from FIG. 5, as the relative rotation angle is increased from A1 to A2, the resultant or associated increase in the relative rotation torque possesses a steep gradient. Even though such a result occurs, the mechanical strength of the plate member 23B is able to accommodate or receive the steep increased torque.

A second embodiment of the damper device according to the present invention is illustrated in FIGS. 6 and 7. In this embodiment, a plurality of axial projections 124a, only one of which is illustrated in FIGS. 6 and 7, are formed integrally with the disc 124 through a stamping-out process. Thus, the projections 124a are formed as one piece and as a unitary structure with the disc 124. The projections 124a are loosely fitted in respective concave or recessed portions 123Ba of an arc-shaped extension 123Bb which is formed integrally with the plate member 123B of the side plate 123. These arc-shaped extensions form expanded parts of the plate member 123B of the side plate 123 that are formed in one piece and as a unitary structure with the plate member 123B. Each recessed portion 123Ba forms an axially extending blind recessed portion. If the relative rotation angle between the side plate 123 and the disc 124 is increased to the value A2 shown in FIG. 5, the inner side of the concave portion 123Ba is brought into engagement with the circumferential surface of the projection 124a, thereby preventing further increase in the relative rotation angle between the side plate 123 and the disc 124. The advantages associated with the damper device illustrated in FIGS. 6 and 7 are the same as those described above with respect to the first embodiment shown in FIGS. 1–4.

Thus, in accordance with the present invention, the projections 24a, 124a and the extended parts 23Bb, 123Bb (including the recessed portions) together define a mechanism that is formed integrally in one-piece as a unitary structure with the driving and driven plates 23, 24 to prevent relative rotational movement between the driven plate and the drive plate after the two plates have rotated a predetermined amount (A2) relative to one another.

It is to be noted that other variations of the present invention are also possible. For example, the disc 24, 124 and the side plate 23, 123 can be connected to the clutch piston 21 and the turbine hub 15, respectively.

The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A damper device in a lock-up clutch of a torque converter device in which a driving plate is connected to a friction plate which is engaged with or disengaged from an input member of the torque converter, a driven plate rotates relative to the driving plate and is connected to an output member of the torque converter, and a spring device is interposed between the driving plate and the driven plate to establish torque transmission and torque absorption, the damper device comprising:
   a projection integrally formed on one of the driving plate and the driven plate and projecting in the radial direction; and
   an arc-shaped expanded part integrally formed at the other of the driving plate and the driven plate and extending in the same direction as the projection, the arc-shaped expanded part being provided with a concave portion having a circumferential end facing towards a side surface of the projection, said projection being fitted in the concave portion and a maximum relative rotation between the driving plate and the driven plate being restricted by direct contact between the side surface of the projection and the circumferential end of the concave portion in the circumferential direction.

2. The damper device as set forth in claim 1, wherein the projection is a radially outwardly extending extension provided at an outer periphery of said one of the driving plate and the driven plate.

3. A torque converter device comprising:
   an input member;
   an output member; and
   a damper device that includes a driving plate connected to a friction plate which is engageable with and disengageable from the input member, a driven plate rotatable relative to the driving plate and connected to the output member, and a spring device interposed between the driving plate and the driven plate to establish torque transmission and torque absorption, the damper device further comprising a radially extending projection integrally formed in one piece with one of the driving plate and the driven plate, and an arc-shaped expanded part integrally formed in one piece with the other of the driving plate and the driven plate, the arc-shaped expanded part being provided with a recessed portion having a circumferential end facing towards a side surface of the projection, said projection being fitted in the recessed portion, with a maximum relative rotation between the driving plate and the driven plates being restricted by direct contact between the side surface of the projection and the circumferential end of the recessed portion.

4. The torque converter device as set forth in claim 3, wherein the projection is a radially outwardly extending extension provided at an outer periphery of said one of the driving plate and the driven plate.

5. The torque converter device as set forth in claim 3, including a plurality of projections provided on the driven plate, and a plurality of arc-shaped expanded parts provided on the driving plate, each arc-shaped expanded part being provided with a recessed portion in which is positioned one of said projections.

6. A damper device in a lock-up clutch of a torque converter device in which a driving plate is connected to a friction plate which is engaged with or disengaged from an input member of the torque converter, a driven plate rotates relative to the driving plate and is connected to an output member of the torque converter, and a spring device is interposed between the driving plate and the driven plate to establish torque transmission and torque absorption, the damper device comprising:
   at least one opening formed in the driven plate and at least one opening formed in the drive plate;
   an elastic device positioned in the at least one opening in the driven plate and the at least one opening in the drive plate to establish torque transmission between the driven plate and the drive plate and to absorb torque variation between the drive plate and the driven plate;
   a radially outwardly extending projection integrally formed with one of the driving plate and the driven plate; and
   an arc-shaped expanded part integrally formed at the other of the driving plate and the driven plate and extending in the same direction as the projection, the arc-shaped expanded part being provided with a recessed portion having a circumferential end facing towards a side surface of the projection, said projection being fitted in the recessed portion so that a maximum relative rotation between the driving plate and the driven plate is limited by direct contact between the side surface of the projection and the circumferential end of the recessed portion.

7. The damper device as set forth in claim 6, including a plurality of spaced apart radially extending projections integrally formed in one piece with one of the driven plate and the drive plate and each received in a respective recessed portion provided on the other of the driven plate and the drive plate.

8. The damper device as set forth in claim 6, wherein the projection is integrally formed in one piece with the driven plate.

9. The damper device as set forth in claim 7, wherein said projections are integrally formed in one piece with the driven plate.

10. The damper device as set forth in claim 1, wherein the projection is formed in one piece with one of the driving plate and the driven plate, and the arc-shaped expanded part is formed in one piece with the other of the driving plate and the driven plate.

11. The damper device as set forth in claim 3, wherein the projection is formed in one piece with one of the driving plate and the driven plate, and the arc-shaped expanded part is formed in one piece with the other of the driving plate and the driven plate.

12. The damper device as set forth in claim 6, wherein the projection is formed in one piece with one of the driving plate and the driven plate, and the arc-shaped expanded part is formed in one piece with the other of the driving plate and the driven plate.

* * * * *